(No Model.)

N. PRINCE.
Windmill.

No. 242,043. Patented May 24, 1881.

WITNESSES:
Francis McArdle
C. Sedgwick

INVENTOR:
N. Prince
BY Munn &Co
ATTORNEYS.

UNITED STATES PATENT OFFICE.

NAPOLEON PRINCE, OF ST. BONIFACE, MANITOBA, CANADA, ASSIGNOR TO HIMSELF AND EDWARD C. PRINCE, OF SAME PLACE.

WINDMILL.

SPECIFICATION forming part of Letters Patent No. 242,043, dated May 24, 1881.

Application filed November 12, 1880. (No model.)

*To all whom it may concern:*

Be it known that I, NAPOLEON PRINCE, of St. Boniface, Province of Manitoba, Dominion of Canada, have invented a new and useful Improvement in Windmills, of which the following is a specification.

Figure 1:
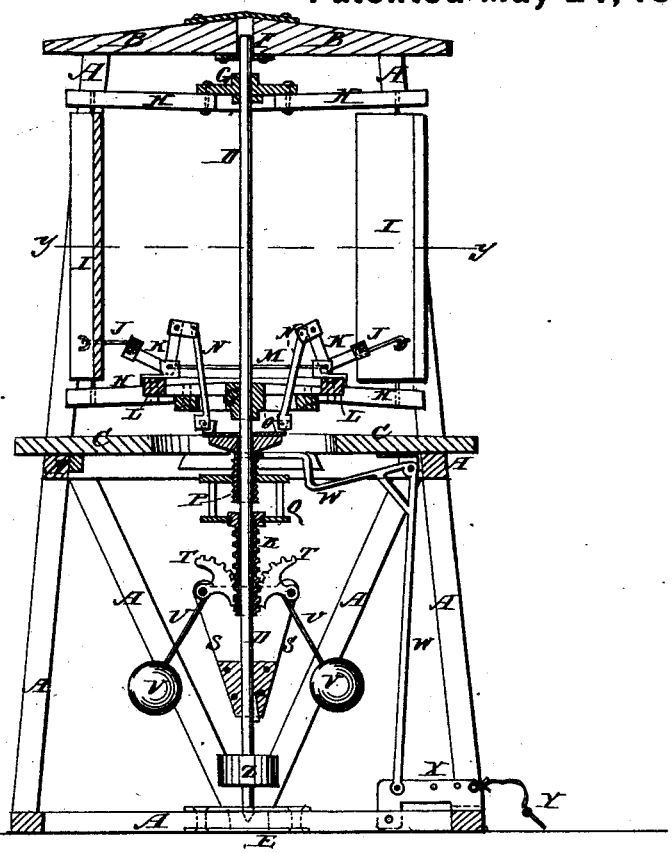
Figure 2:
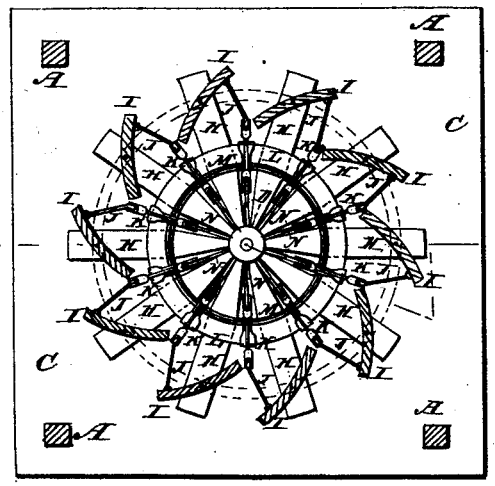

Figure 1 is a sectional side elevation of the improvement, taken through the line $x\ x$, Fig. 2. Fig. 2 is a sectional plan view taken through the line $y\ y$, Fig. 1.

The object of this invention is to furnish windmills so constructed that they can be adjusted to run at any desired speed and in either direction, which will adjust themselves, as the force of the wind varies, so as to run at a uniform speed, which can be readily thrown out of the wind and can be instantly stopped, and which can be mounted upon wheels, so that they can take the place of stationary and portable steam-engines, ordinary wind-wheels, and water-wheels.

Similar letters of reference indicate corresponding parts.

A represents the frame or tower of the wind-wheel, which may be made of any desired height and size, as circumstances may require, and can be mounted upon wheels, so that it can be readily moved from place to place.

The frame A is covered with a roof, B, and is provided with a floor or platform, C, at the base of the wheel-chamber, to protect the ends of the wheel from the weather and from the wind.

D is the wheel-shaft, the lower end of which revolves in a step or other suitable thrust-bearing, E, at the center of the base of the frame A. The upper end of the shaft D revolves in a bearing, F, at the center of the roof B.

To the shaft D, a little below the roof B and a little above the platform C, are attached two hubs, G, to each of which are attached ten or eight radial arms or spokes, H, in such positions that the arms of the upper wheel will be directly over the corresponding arms of the lower wheel.

To and between the ends of the corresponding arms of the two wheels G H are pivoted, at the centers of their ends, the wings I, which may be flat plates, or plates concave upon the inner side and convex upon the outer side, being in the form of sections of a hollow cylinder. The wings I are of such a size that when all the wings are turned edge to edge the said edges will meet, or nearly meet, forming a hollow polygonal or circular cylinder. With this construction, as one or the other edge of the wings I is turned outward at an angle to receive the wind the wheel will be revolved in one or the other direction. I prefer to make the wings I concave upon the inner side, as giving the wind a better hold upon them.

To the lower part of each of the wings I, at a little distance from its side edge, is pivoted the end of a connecting-rod, J, the other end of which is pivoted to the end of the outer arm of a bent or angle lever, K. The angle-levers K are pivoted at their angles to a ring-plate, L, attached to the radial arms H.

The levers K may be pivoted by separate bolts or rivets, or all the levers K may be pivoted by a single rod, M, bent into ring form, as shown in Figs. 1 and 2. The latter construction is preferred, as in this case the rod M braces the levers K, and thus strengthens them in place.

To the ends of the other or inner arms of the levers K are pivoted the upper ends of rods N, which pass down through guide-slots in the flange of the hub G, to which flange the radial arms H are attached, or in a plate attached to the said radial arms H. The lower ends of the rods N are pivoted to a plate or flange, O, attached to or formed upon the upper end of a sleeve, P, placed upon the shaft D, so that the wings I can be adjusted by sliding the sleeve P up and down upon the shaft D. The sleeve P is kept from turning upon the shaft D by the rods N striking against the plate or flange through slots in which they pass, or it may be connected with the said shaft by a tongue and groove or other suitable means.

Upon the outer surface of the sleeve P is formed a screw-thread to receive a screw-thread formed in the inner surface of the upper part of the coupling Q, the lower end of which is swiveled to the upper end of the bar R. The bar R is perforated longitudinally to receive the shaft D, and slides up and down upon the said shaft freely. Two opposite sides of the bar R have rack-teeth formed in them, and the other two sides are made flat for the plates S to rest against, and thus hold the rack-bar from turning upon the shaft D. The plates S are placed upon the opposite sides of the shaft D, and are attached at their lower ends or angles to a block keyed or otherwise secured to the shaft D.

To and between the upper angles of the plates S are pivoted segments T of gear-wheels, at the centers of the circles of which the said segments are a part. The teeth of the segments T mesh into the teeth of the sliding rack-bar R, and to the said segments are attached downwardly-inclined rigid arms U, to the outer ends of which are attached ball-weights V. With this construction, as the speed of the wheel increases the balls V are raised by centrifugal force, which causes the segments T to draw the rack-bar R downward, and with it the sleeve P, closing the wings I more or less as the force of the wind varies. As the speed of the wheel decreases the balls descend, which raises the rack-bar R and opens the wings I more or less, according to the decrease in the force of the wind.

By turning the coupling Q up or down upon the sleeve P the connection between the wings I and the governor can be so adjusted that the movements of the said governor will adjust the said wings as desired.

Around the upper part of the sleeve P is formed a ring-groove to receive the forked end of a bent lever, W, which is pivoted at its angle to the frame A. The other arm of the lever W projects downward, and extends into the space between two bars, X, attached to the base of the frame A, and made of such a length as to allow the lower end of the lever W to have such a sweep as will throw either edge of the wings into the wind.

In the lower end of the lever W, and in the bars X, are formed holes to receive the pin Y to lock the said lever W, and with it the wings, in any desired position.

To the lower part of the shaft D is attached a pulley, Z, to receive a belt for driving any desired machinery.

The governor has been described as being applied to the shaft D below the wind-wheel; but it may be placed within the wind-wheel, or upon any other desired part of the said shaft.

Having thus fully described my invention, I claim as new and desire to secure by Letters Patent—

1. A windmill constructed substantially as herein shown and described, consisting of the shaft D, the wheels G H, the vertical-pivoted wings I, the bent levers K, and their connecting-rods J N, the sliding sleeve P, having screw-threads upon its outer surface, the swiveled screw-coupling Q, the sliding rack-bar R, the gear-segments T, having arms U and weights V, and the supporting-plates S, as set forth.

2. In a windmill, the combination, with the shaft D, the spoke-wheels G H, the circle of vertical pivoted wings I, the bent levers K, the connecting-rods J N, and the sliding sleeve P, of the bent lever W and the guide-bars X, substantially as herein shown and described, whereby the wings can be thrown out of and into the wind, as set forth.

NAPOLEON PRINCE.

Witnesses:
DAVID McGREGOR,
R. L. McGREGOR.